(12) United States Patent
Mérant et al.

(10) Patent No.: US 7,500,342 B2
(45) Date of Patent: Mar. 10, 2009

(54) HARVESTING DEVICE COMPRISING FLEXIBLE LINKS FOR A MACHINE FOR HARVESTING FRUITS, BERRIES AND THE LIKE

(75) Inventors: Jean-Camille C. R. Mérant, Meigné-sous-Doué (FR); Christophe Robert Defurne, La Chapelle-Hermier (FR)

(73) Assignee: CNH France, S.A. (FR)

( * ) Notice: Subject to any disclaimer, the term of this patent is extended or adjusted under 35 U.S.C. 154(b) by 112 days.

(21) Appl. No.: 10/558,337

(22) PCT Filed: May 27, 2004

(86) PCT No.: PCT/EP2004/050945

§ 371 (c)(1),
(2), (4) Date: Nov. 9, 2006

(87) PCT Pub. No.: WO2004/105463

PCT Pub. Date: Dec. 9, 2004

(65) Prior Publication Data

US 2007/0107408 A1    May 17, 2007

(30) Foreign Application Priority Data

May 27, 2003   (FR) .................................. 03 06392

(51) Int. Cl.
*A01D 46/00*    (2006.01)
(52) U.S. Cl. ....................................... 56/330; 56/340.1
(58) Field of Classification Search ............... 56/121.42, 56/328.1, 330, 332, 340.1
See application file for complete search history.

(56) References Cited

U.S. PATENT DOCUMENTS 3,774,381 A * 11/1973 Burton ........................ 56/330

(Continued)

FOREIGN PATENT DOCUMENTS

FR           2605487           10/1986

(Continued)

*Primary Examiner*—Thomas B Will
*Assistant Examiner*—Mai T Nguyen
(74) *Attorney, Agent, or Firm*—Rebecca Henkel

(57) ABSTRACT

A harvesting device comprises two shaker assemblies mounted face-to-face on a straddle carrier frame for shaking fruit-bearing trees or bushes. Each shaker assembly comprises a plurality of horizontal flexible material rods having a first end detachably fixed to an oscillatory vertical support, a median portion adapted to act on the fruit-bearing trees or shrubs to shake them, and a second end connected to the frame by a connecting link that is horizontal and perpendicular to a vertical median plane of symmetry of the frame. Hence, in operation, the second end of the rod is maintained at a substantially constant distance from the vertical median plane of symmetry. The connecting link is fixed to the frame by a rigid connection and is flexible in a substantially horizontal plane, so that, in operation, the end of the connecting link adjoining the rod moves to-and-fro substantially horizontally in a direction substantially parallel to the vertical median plane of symmetry.

5 Claims, 6 Drawing Sheets

U.S. PATENT DOCUMENTS

| | | | | |
|---|---|---|---|---|
| 4,022,001 A | * | 5/1977 | Burton | 56/330 |
| 4,063,406 A | * | 12/1977 | Burton | 56/330 |
| 4,924,666 A | * | 5/1990 | Poncet | 56/330 |
| 5,291,726 A | * | 3/1994 | Nairn | 56/330 |
| 5,495,708 A | * | 3/1996 | Scott et al. | 56/329 |
| 5,642,610 A | * | 7/1997 | Dupon et al. | 56/340.1 |
| 5,765,350 A | * | 6/1998 | Ochse | 56/328.1 |
| 6,009,186 A | * | 12/1999 | Gorretta et al. | 382/110 |

FOREIGN PATENT DOCUMENTS

| | | |
|---|---|---|
| FR | 2641158 | 12/1988 |
| FR | 2789262 | 5/1999 |
| FR | 2813493 | 5/2000 |

* cited by examiner

HARVESTING DEVICE COMPRISING FLEXIBLE LINKS FOR A MACHINE FOR HARVESTING FRUITS, BERRIES AND THE LIKE

FIELD OF THE INVENTION

The present invention relates to a harvesting device for a machine for harvesting fruits, berries and the like borne by fruit-bearing trees and shrubs planted in rows.

BACKGROUND OF THE INVENTION

A harvesting device for a machine harvesting fruits comprising of a straddle carrier frame having a vertical median plane of symmetry; two shaker assemblies which are mounted face-to-face on the frame on respective opposite sites of the vertical median plane of symmetry and for shaking the fruit-bearing trees or shrubs passing between the two shaker assemblies to detach the fruits, berries or the like therefrom, each shaker assembly comprising: drive mechanism; a plurality of vertically spaced shaker members, each shaker member comprising a flexible material rod that extends substantially horizontally and has a curved shape, each rod having a first end that is connected to the drive mechanism, a median portion that is adapted to engage the fruit-bearing trees or shrubs to shake them, and a second end that is connected to the frame by a connecting link that extends substantially horizontally and perpendicularly to said vertical median plane of symmetry so that, in operation, said second end of the rod is maintained at a substantially constant distance from said vertical median plane of symmetry.

Harvesting devices of the type described hereinabove are known in the art. Such harvesting devices are described in the documents FR 2 605 487, 2 789 262 and 2 813 493, for example. In these prior art harvesting devices, and in the corresponding harvesting machines that have been made commercially available, each connecting link comprises a rigid metal component that is connected firstly to the second end of the corresponding flexible shaker rod and secondly to the frame by articulated connections. The articulated connection between the link and the flexible shaker rod usually comprises a ball joint and the articulated connection between the link and the frame usually comprises two ball bearings or roller bearings. Given that, in service, the links connecting the flexible shaker rods to the frame are continually subjected to an oscillatory movement and operate in an environment laden with dust and/or plant debris, the ball joints and the ball or roller bearings of the connecting links have to be lubricated frequently, around every eight hours of service. Given that each harvesting machine may comprise up to fourteen or even more shaker rods, and thus fourteen connecting links, and consequently fourteen ball joints and twenty-eight ball or roller bearings, it is clear that lubrication is a lengthy and complicated operation. Furthermore, the operator of the machine must take care not to get grease or oil onto components which, in service, come into contact with the fruit-bearing trees or bushes, and in particular with vines, as this could have harmful effects on the vinification process.

It has also become apparent that, in operation, the inertia of the connecting links, which comprise relatively heavy rigid metal members, may interfere with the movement of the flexible shaker rods.

Also known in the art (FR 2 641 158, FIG. 6) is a harvesting device in which each shaker rod has a rear end connected to the frame by a leaf spring, one end of which is connected to the rear end of the shaker rod by an articulated connection and the other end of which is connected to the frame by a rigid connection. However, in this case, the leaf spring is parallel to the vertical median plane of symmetry of the harvesting device and is prestressed in such a manner as to confer differential flexibility on the assembly comprising the shaker rod and the leaf spring. To be more precise, the leaf spring opposes or brakes the movement of the shaker rod when that movement is outward relative to the vertical median plane of symmetry of the harvesting device, whereas it does not oppose, or even assists, the movement of the shaker rod when that movement is toward said vertical median plane of symmetry. Although the leaf spring also provides a connection between the shaker rod and the frame, it has neither the same disposition nor the same function as the connecting link of the harvesting device to which the present invention relates, in the sense that the leaf spring does not maintain the rear end of the shaker rod at a substantially constant distance from said vertical median plane of symmetry. To the contrary, with the harvesting device shown in FIG. 6 of the document FR 2 641 158, in service, the rear end of the shaker rod moves to-and-fro in a direction substantially perpendicular to the vertical median plane of symmetry, with an amplitude equal or substantially equal to the amplitude of the to-and-fro movement of the median active part of the shaker rods.

SUMMARY OF THE INVENTION

Thus an object of the present invention is to reduce or even to eliminate completely the necessity to grease or lubricate the articulated connections of the connecting links of a harvesting device of the type defined in the preamble.

To this end, the present invention consists in a harvesting device of the type defined hereinabove which is wherein in that said connecting link is fixed to the frame by a rigid connection and is flexible in a substantially horizontal plane, at least in an intermediate region between its two ends, so that, in operation, the end of the connecting link adjoining the rod moves to-and-fro substantially horizontally in a direction substantially parallel to said vertical median plane of symmetry.

In this case, the two ball or roller bearings usually included in the articulated connection at the end of each connecting link adjoining the frame of harvesting devices of the type described in the document FR 2 605 487 mentioned above, for example, are eliminated, and likewise the obligation to grease those bearings. Moreover, because the flexible connecting links used in the harvesting device according to the invention may be made from a plastic material, for example a polyamide or a polyurethane, they are much lighter than the metal links used in the prior art machines. They therefore have a lower inertia and a reduced tendency to interfere with the movement of the shaker rods to which they are attached.

The harvesting device according to the invention may further have one or more of the following features:

the connecting link has an oblong cross-section with a larger dimension oriented vertically and a smaller dimension oriented horizontally;

the larger dimension and the smaller dimension of the cross-section of the connecting link are in a ratio of approximately 4:1 at least in the end portion of the connecting link adjoining the frame;

the larger dimension of the cross-section of the connecting link has a value that decreases from the end portion of the connecting link adjoining the frame toward the end portion adjoining the rod;

the ratio of the larger dimension to the smaller dimension in said end portion adjoining the rod is approximately 2.5:1;

the smaller dimension of the cross-section of the connecting link is substantially constant throughout the length of the connecting link;

said cross-section has a substantially rectangular shape;

said rigid connection comprises a mounting part that is fixed to a leg of the frame in a detachable but rigid manner such that its height is adjustable and comprises a bearing plate situated in a vertical transverse plane substantially perpendicular to said vertical median plane of symmetry, a clamping plate, and at least one clamping bolt passing through aligned holes in the clamping plate, the end portion of the connecting link adjoining the frame, and the bearing plate, to clamp said end portion adjoining the frame firmly between the bearing plate and the clamping plate;

the bearing plate and the clamping plate are curved in opposite directions so that they diverge substantially from the area in which the clamping bolt is located toward said vertical median plane of symmetry.

In one embodiment of the invention the end portion of the connecting link adjoining the rod is connected to the corresponding rod by a articulated connection having a vertical axis.

In this case, said vertical-axis articulated connection may comprise a yoke that is fixed rigidly to the second end of the corresponding rod by nuts and bolts and has a C-shaped vertical cross-section open laterally toward the outside of the harvesting device, a vertical-axis socket whose axial length is less than the distance between the flanges of the yoke, two parallel vertical plates that are welded by one edge to the socket and which clamp between them the end portion of the connecting link adjoining the rod, to which they are fixed by nuts and bolts, a bolt that passes through the socket and through aligned holes in the flanges of the yoke and serves as a vertical pivot, and anti-friction members disposed radially between the socket and the bolt and axially between the socket and each of the flanges of the yoke.

In another embodiment of the invention the end portion of the connecting link adjoining the rod is connected to the corresponding rod by a rigid connection.

In this case, the invention also eliminates the ball joint that was included in the articulated connection at the rod end of each connecting link of the prior art harvesting device described above, and likewise the obligation to grease said ball joint.

In this other embodiment, said rigid connection at the end of said connecting link adjoining the rod comprises a connecting part that is generally L-shaped with an L-shaped vertical wall and two horizontal reinforcing flanges opposing deformation of said vertical wall, a first clamping plate, and at least one first combination of a clamping bolt and a clamping nut for firmly clamping the second end of the corresponding rod between the first clamping plate and a first branch of the L-shape formed by said vertical wall, a second clamping plate and at least one second combination of a clamping bolt and a clamping nut for firmly clamping the end portion of the connecting link adjoining the frame between the second clamping plate and a second branch of the L-shape formed by said vertical wall.

Said second clamping plate and said second branch of the L-shape formed by said vertical wall are preferably curved in opposite directions so that they diverge substantially from the region in which the second bolt is located toward the free end of said second branch of the L-shape formed by said vertical wall.

The invention also provides a grape harvesting machine wherein in that it comprises a harvesting device having one or more of the features previously cited.

BRIEF DESCRIPTION OF THE DRAWINGS

Other features and advantages of the invention will emerge in the course of the following detailed description, which is given by way of example and with reference to the accompanying drawings, in which.

DETAILED DESCRIPTION OF THE PREFERRED EMBODIMENTS

The invention relates in particular, although not exclusively, to harvesting grapes, and will be more particularly described in relation to that type of harvest, although a machine including the harvesting device according to the invention may equally well be used for harvesting other fruits and berries, for example blackcurrants, gooseberries, raspberries, olives or coffee beans.

Figure 1:
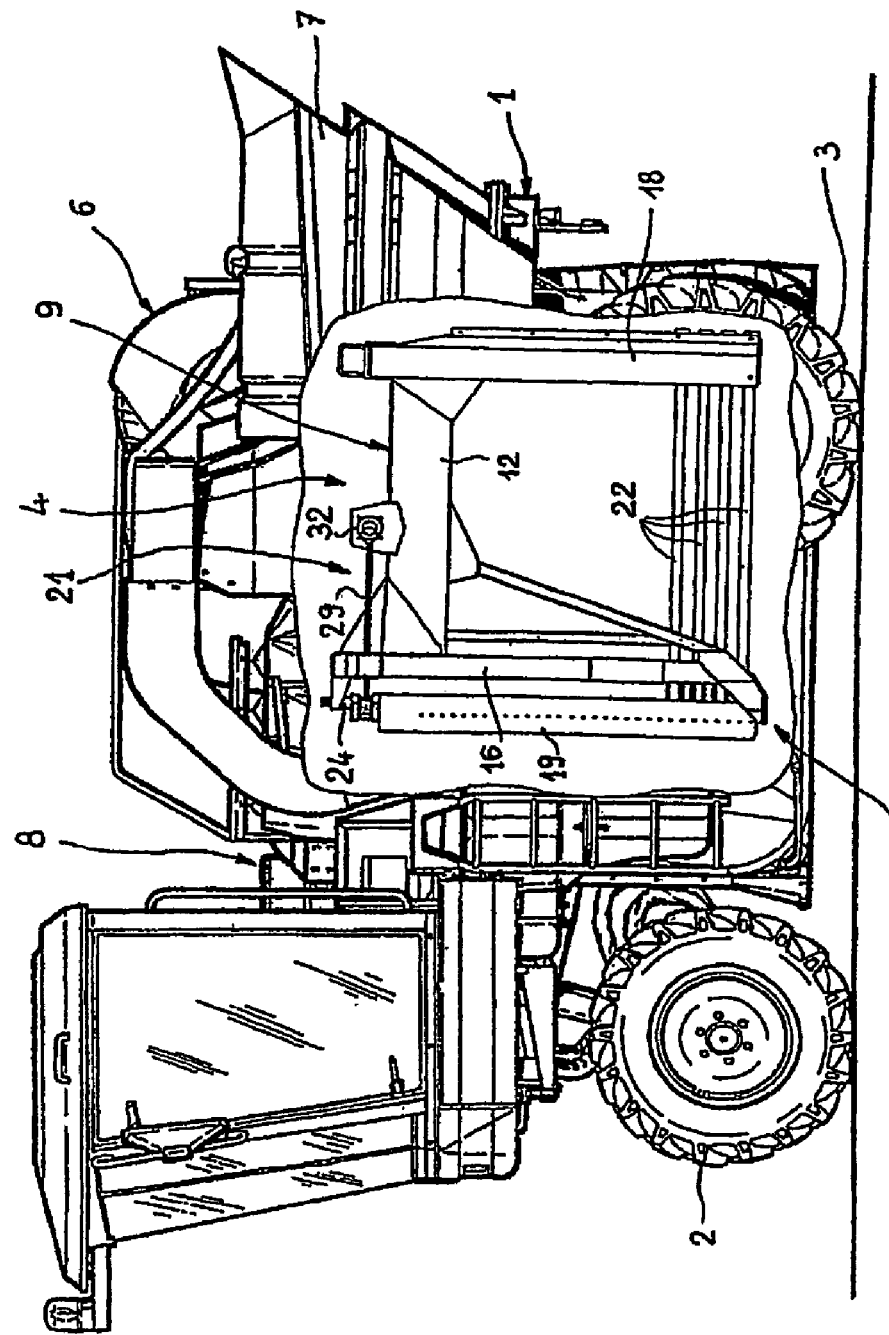
FIG. 1 is a partly cutaway view in lateral elevation showing a grape harvesting machine equipped with a harvesting device according to one embodiment of the present invention.

In a manner that is known in the art, the harvesting machine represented in FIG. 1 comprises a main frame 1 equipped with front wheels 2 and rear wheels 3 to enable it to travel over the ground. The frame 1 is in the shape of a gantry so as to be able to straddle at least one row of plants, for example a row of vines, or a plurality of rows of plants, for example two or three rows of vines if the machine is intended for use in closely planted vineyards. In a manner that is also known in the art, the frame 1 carries a harvesting device 4 comprising two shaker assemblies 5 and two elevator conveyors 6 for collecting the grapes detached by the two shaker assemblies 5 and feeding them to at least one temporary storage hopper 7 (two hoppers are usually provided on respective opposite sides of the machine), together with an engine 8 providing the power necessary to drive the various active parts of the machine and also to drive the wheels thereof if the machine is self-propelled.

The harvesting device 4 may be fixed permanently to the frame 1 of the machine or may take the form of a removable assembly that is detachably fixed to the frame 1 so that it can be replaced by other equipment or accessories, such as spraying equipment, pruning equipment, equipment for working the ground, etc. As appropriate, the harvesting device 4 may be supported directly by the frame 1 of the machine or by an auxiliary frame 9, which is also in the shape of a gantry and is sized to straddle a single row of vines. In a manner that is known in the art, the auxiliary frame 9 may be fixed relative to the frame 1 or its upper portion may be mounted in a hanging position, pivoting about a horizontal longitudinal axis.

Figure 2:
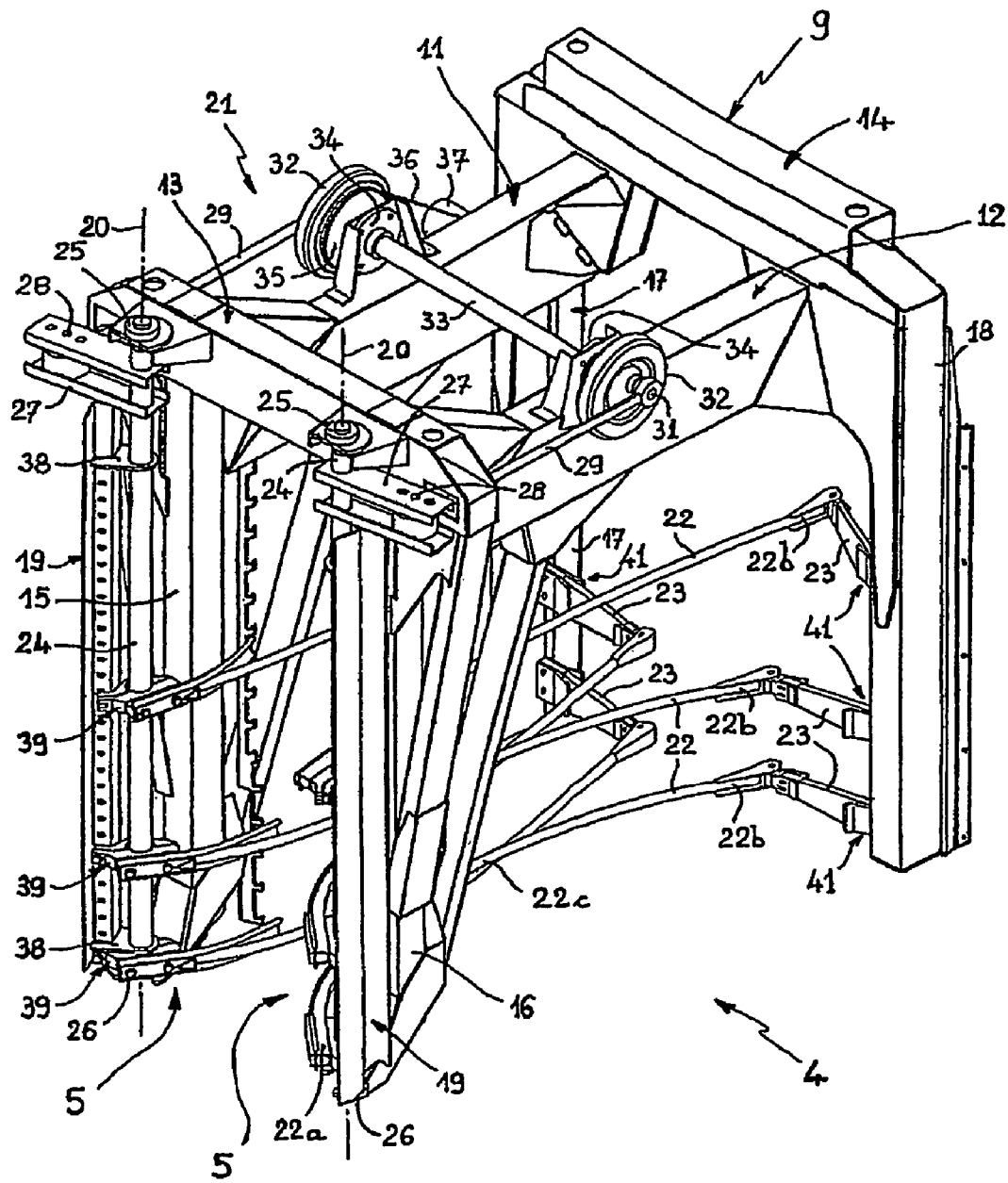
FIG. 2 is a perspective view to a larger scale showing the essential components of the harvesting device of the machine represented in FIG. 1.

In FIG. 2, the two shaker assemblies 5 of the harvesting device 4 are mounted face-to-face on the auxiliary frame 9 on respective opposite sides of the vertical median plane of symmetry of the frame 9. In a manner that is known in the art, the frame 9 is constructed by welding together two girders 11 and 12, a front cross-piece 13, a rear cross-piece 14, two vertical front legs 15 and 16, and two vertical rear legs 17 and 18.

In a manner that is known in the art, each of the two shaker assemblies 5 comprises a vertical oscillatory plate 19 which, in service, is oscillated about a vertical axis 20 by a drive mechanism 21, and a plurality of vertically spaced shaker members 22. For example, each shaker assembly 5 may comprise four shaker members 22, as shown in FIG. 1, or three shaker members, as shown in FIG. 2. Of course, each shaker assembly 5 could comprise a greater number of shaker members if required.

In a manner that is known in the art, each shaker member comprises a rod whose cross-section is small compared to its length and which is made from a flexible material such as a polyester resin reinforced with glass fibres or a polyamide, for example. In the case of vines, good results have been obtained with rods having a circular section of approximately 30 mm diameter and a length of approximately 1.8 m, made from a type 6 polyamide whose Young's modulus E is equal to 3 000 N/mm$^2$. In a manner that is known in the art, each rod 22 may be solid or hollow (tubular), or may have a composite structure with a core having the required flexibility characteristics covered by a wear material different from the material of the core, as described in the document FR 2 789 262. When unstressed, each rod 22 is substantially straight; when it is mounted in the harvesting device 4, it extends broadly horizontally and is curved or flexed into an arc shape whose convex side is oriented toward the vertical median plane of symmetry of the frame 9.

In the harvesting machine described here, the front end 22a of each rod 22 is connected to one of the two vertical oscillatory plates 19 by a kind of releasable coupling 39. Each releasable coupling 39 may be identical to that described and represented in detail in the document FR 2 813 493, for example, and for this reason is not described again in detail here, in that this is not necessary for understanding the invention. Of course, other types of detachable connection may also be used to connect the front end 22a of each rod 22 to the corresponding vertical oscillatory plate 19, such as that described in the document FR 2 789 262.

On the other hand, the rear end 22b of each rod 22 is connected to the frame 9, to be more precise to one of the two rear legs 17 and 18, by a link 23, in a manner described in more detail later. The median portion 22c of each rod 22 is the portion which, in service, shakes the fruit-bearing trees or shrubs.

Each shaker assembly 5 further comprises a vertical shaft 24 that extends parallel to the vertical oscillatory plate 19, as shown in FIG. 2, and whose geometrical axis coincides with the vertical axis 20 of oscillation of said vertical oscillatory plate. The shaft 24 of each shaker assembly 5 rotates in two bearings 25 and 26 that are respectively installed on the front cross-piece 13 and at the lower end of the front leg 15 or 16. A radial driving arm 27 coupled to the drive mechanism 21 is fixed rigidly to one end of each shaft 24, preferably the upper end. To be more precise, as shown in FIG. 2, each driving arm 27 is articulated by a pivot 28 to one end of a link 29 whose other end is articulated to the crank-pin 31 of an eccentric 32. The lengths of the two links 29 are preferably adjustable. The two eccentrics 32 are fixed to respective ends of a shaft 33 that rotates in two bearings 34 carried by the girders 11 and 12, respectively. A pulley or sprocket wheel 35 is also fixed to the shaft 33 and is connected by a transmission belt or chain 36 to another pulley or sprocket wheel (not shown), rotation of which may be driven by a motor 37, for example a hydraulic motor. Each vertical oscillatory plate 19 is connected rigidly to the adjacent vertical shaft 24 by at least two spacer plates 38 which are welded to the plate 19 and to the shaft 24. Accordingly, when the motor 37 is operating, each vertical plate 19 oscillates with the vertical shaft 24 about the corresponding oscillation axis 20.

Figure 5:
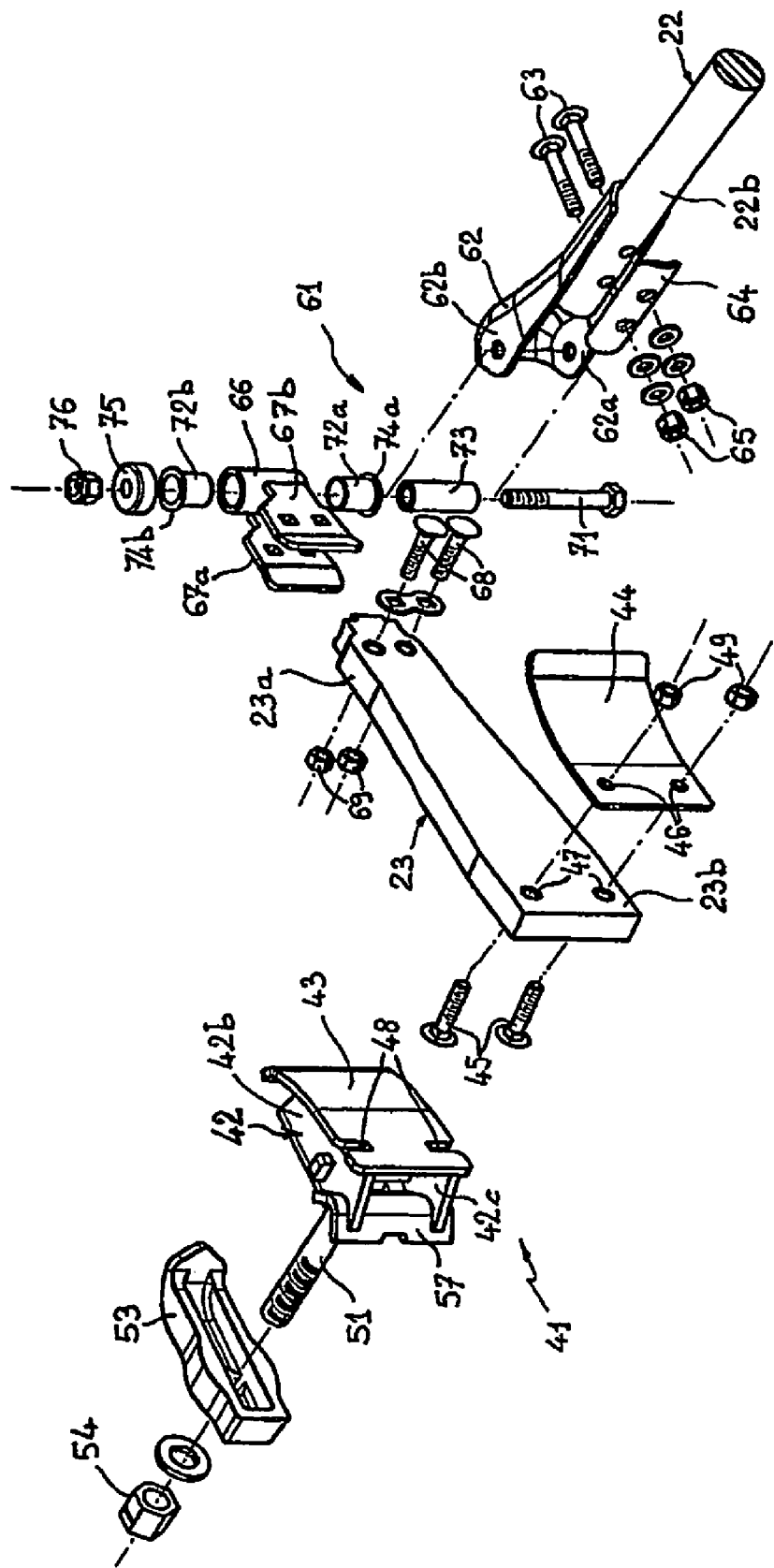
FIG. 5 is an exploded perspective view of components for connecting the rear end of the shaker member to the vertical leg of the frame.

As indicated above, the rear end 22b of each rod 22 of each shaker assembly 25 is connected to the corresponding rear leg 17 or 18 of the frame 9 by a link 23. In the harvesting machine according to the invention, each link 23 is fixed to the corresponding rear vertical leg 17 or 18 of the frame 9 by a rigid connection 41 described in detail later. Furthermore, each link 23, which extends broadly perpendicularly to the vertical median plane of symmetry of the frame 9, is flexible in a substantially horizontal plane so that, in operation, the end 23a of the link 23 adjoining the rod 22 moves to-and-fro substantially horizontally in a direction substantially parallel to said vertical median plane of symmetry. In the present context, the term "flexible link" mechanism that the link is made from a flexible material and/or has a configuration or a structure enabling it to flex in a substantially horizontal plane. For example, each link 23 may be made from a plastic material such as a polyamide or a polyurethane, and may have an oblong, for example rectangular, cross-section with the larger dimension oriented vertically and the smaller dimension oriented horizontally, as can be seen in FIGS. 2 and 5 in particular. In this case, the link 23 has a higher moment of inertia about a horizontal axis than about a vertical axis, and consequently greater flexibility in a horizontal plane than in a vertical plane.

The larger dimension and the smaller dimension of the cross-section of the link 23 are preferably in a ratio of 4:1, at least in the end portion 23b of said link adjoining the frame. Furthermore, the larger dimension of the cross-section of the link 23 preferably decreases from the end portion 23b of said link toward the end portion 23a, as can be seen in FIGS. 2, 4 and 5 in particular. In this case, the ratio of the larger dimension to the smaller dimension in the end portion 23a adjoining the rod is approximately 2.5:1, for example. The smaller dimension of the cross-section of the link 23 is preferably constant or substantially constant over the whole length of said link, as can be seen in FIGS. 3 and 5, for example.

Figures 3, 4:
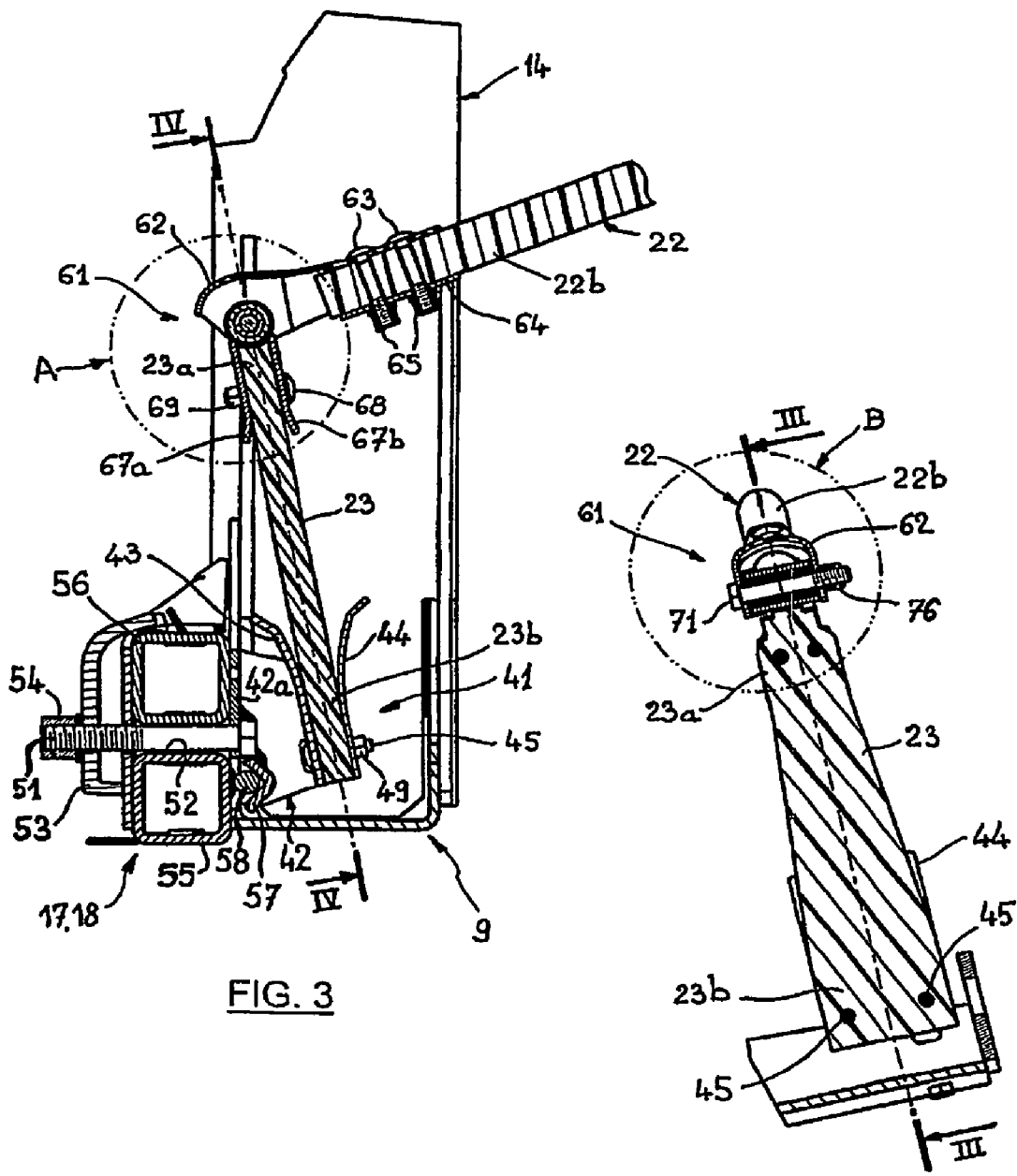
FIG. 3 is a view in horizontal section showing how the rear end of a shaker member is connected to a vertical leg of the frame of the harvesting device.
FIG. 4 is a view in section take along the line IV-IV in FIG. 3.

As can also be seen in FIGS. 3 and 5 in particular, each rigid connection 41 comprises a mounting part 42 provided with a bearing plate 43, a clamping plate 44, at least one clamping bolt, and preferably two clamping bolts 45 passing through aligned holes 46 and 47 in the counter-plate 44 and in the end portion 23b of the link 23, respectively, and notches (or holes) 48 in the bearing plate 43, and at least one clamping nut, and preferably two clamping nuts 49 cooperating with the clamping bolts 45 to clamp the end portion 23b of the link 23 firmly between the bearing plate 43 and the clamping plate 44.

The mounting part 42 may be made from sheet metal, for example, cut and bent to a U-shaped profile so that it has a base portion 42a (visible only in FIG. 3) and two lateral flanges 42b, 42c (FIG. 5) to which the bearing plate 43 is fixed, for example welded. The base portion 42a of the mounting part 42 is pressed against a vertical face of the leg 17 or 18 of the frame 9, which face is situated in a vertical plane perpendicular or substantially perpendicular to the vertical median plane of symmetry of the frame 9 so that, in service, the bearing plate 43 lies in a vertical transverse plane substantially perpendicular to said vertical median plane of symmetry and the corresponding link 23 is therefore itself substantially perpendicular to said vertical median plane of symmetry.

The mounting part 42 is rigidly but detachably fixed to the leg 17 or 18 of the frame 9 by a bolt 51 that passes through a hole in the base portion 42a of the mounting part 42 and through a passage 52 in the leg 17 or 18, a clamp 53 that bears against a vertical face of the leg 17 or 18 opposite the face against which the base portion 42a is pressed, and a clamping nut 54. The head of the bolt 51 is preferably welded to the base portion 42a of the mounting part 42 so that the bolt cannot fall out and is prevented from turning relative to the mounting part 42 (after installation in the part 42, the head of the bolt 51 is not longer accessible to apply a wrench to immobilise the bolt while tightening the nut 54).

Each of the two legs 17 and 18 of the frame 9 may comprise two tubes or tubular uprights 55 and 56 of rectangular cross-section that are parallel to each other and at a distance from each other slightly greater than the diameter of the bolts 51 used to fix the mounting parts 42 to the leg 17 or 18. Thus the space between the two tubes 55 and 56 forms the passage 52 for the bolts 51, allowing continuous adjustment of the height of each mounting part 42 if the corresponding clamping nut 54 is loosened.

To prevent rotation of each mounting part 42 about the axis of the corresponding bolt 51, whilst also guiding vertical movement of the mounting part 42, part of the base portion 42a of the latter is removed on one side of the head of the bolt 51 and replaced by a short part 57 (FIGS. 3 and 5) with a V-shaped profile welded to the two flanges 42b and 42c of the mounting part 42. Additionally, a cylindrical rod 58 is fixed, for example welded, to the tubular upright 55 so as to extend vertically along it. Accordingly, in service, when the mounting part 42 is fixed to the leg 17 or 18, the V-profile part 57 cooperates with the cylindrical rod 58 to prevent rotation of said mounting part 42 about the axis of the bolt 51.

The bearing plate 43 and the clamping plate 44 are preferably curved in opposite directions so that they diverge substantially from the area in which the clamping bolts 45 are located, i.e. from the end portion 23b of the link 23, to the end portion 23a of said link, i.e. towards the vertical median plane of symmetry of the frame 9. Accordingly, in service, the divergent portions of the bearing plate 43 and the clamping plate 44 form reinforcing and progressive bearing mechanism for the link 23 when it is flexed alternately toward the front and toward the rear of the harvesting machine.

In the embodiment represented in FIGS. 3 to 7, the rear end 22b of each rod 22 of each shaker assembly 5 is connected to the end portion 23a of the corresponding link 23 by an articulated connection 61 with a vertical axis. Each vertical-axis articulated connection 61 comprises a yoke 62 which has a C-shaped vertical cross-section open laterally toward the outside of the harvesting device and is bolted rigidly to the rear end 22b of the corresponding rod 22. To be more precise, the yoke 62 may be fixed to the rear end 22b of the rod 22 by two clamping bolts 63, a clamping plate 64, and two clamping nuts 65, for example, as may be seen in FIGS. 3 and 5 in particular.

Figure 7:
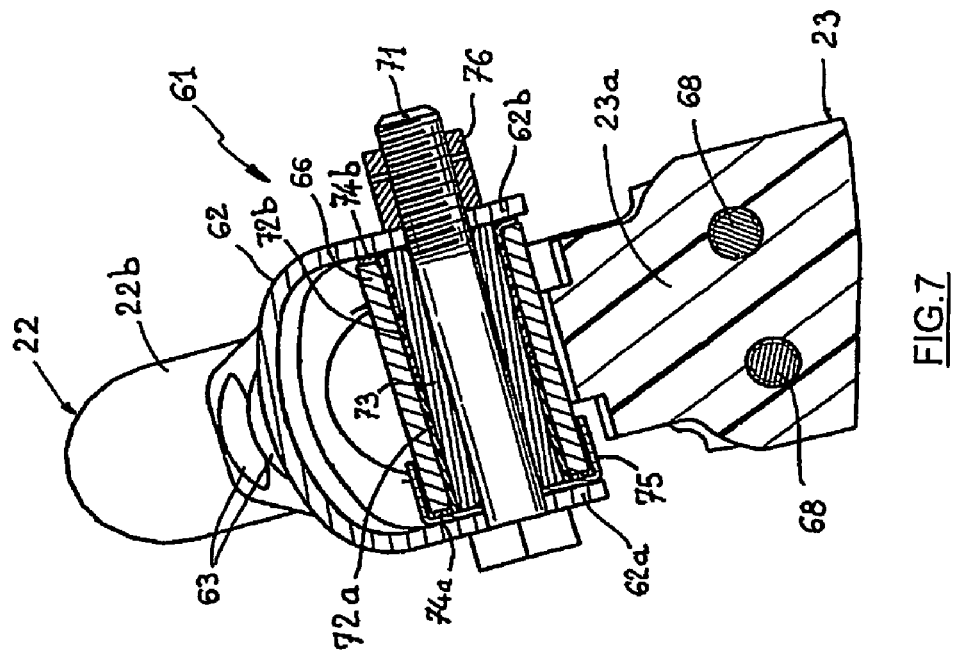
FIG. 7 shows the detail B from FIG. 4 to a larger scale.
Figure 6:
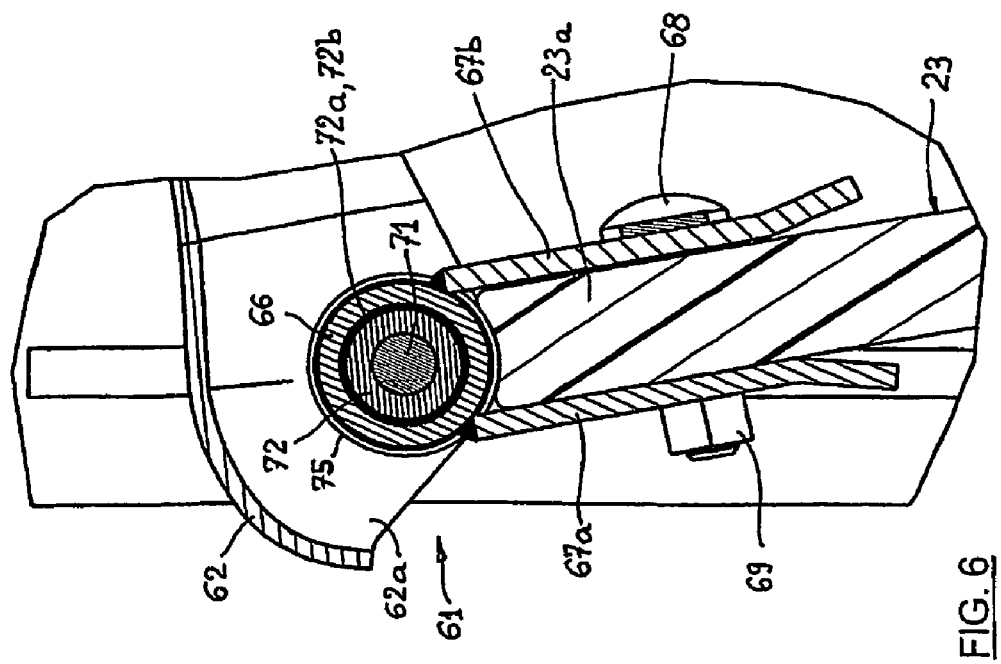
FIG. 6 shows the detail A from FIG. 3 to a larger scale.

Each articulated connection 61 further comprises a vertical-axis socket 66 made of stainless steel, for example, whose axial length is shorter than the distance between the flanges 62a and 62b of the C-section yoke 62, and two parallel vertical plates 67a and 67b that are welded by one edge to the socket 66 and clamp between them the end portion 23a of the link 23, to which they are bolted, for example by two bolts 68 and two nuts 69 (FIGS. 5, 7).

Each articulated connection 61 further comprises a bolt 71 that passes through the socket 66 and aligned holes in the flanges 62a and 62b of the yoke 62 and provides a pivot, and anti-friction members 72a and 72b disposed radially between the socket 66 and the bolt 71 and axially between the socket 66 and each of the flanges of the yoke 62. To be more precise, the anti-friction members 72a and 72b may be bearings made of a self-lubricating plastic material disposed concentrically and end-to-end between the socket 66 and a cylindrical stainless steel sleeve 73 around the bolt 71. Each of the two bearing members 72a, 72b has a flange 74a, 74b at one end that is placed between one end of the socket 66 and the corresponding flange 62a or 62b of the yoke 62. A stainless steel cup 75 at one end of the socket 66, for example its upper end, covers a portion of its peripheral surface. Another cup (not shown) identical to the cup 75 may be disposed at the other end of the socket 66 if required.

The axial length of the stainless steel sleeve 73 is equal to the distance between the flanges 62a and 62b of the yoke 62 less the thickness of the cup 75 (or both cups if two are provided). In this case, when a clamping nut 76 is screwed onto the screwthreaded end of the bolt 71 and tightened, the two flanges 62a and 62b of the yoke 62 bear axially on the ends of the sleeve 73 without axially compressing the two bearings 72a and 72b and the socket 66, thus enabling the socket 66 to turn freely about the sleeve 73.

The two bearings 72a and 72b may be JFM 1820-22 bearings from IGUS GmbH, Cologne, Germany. Such bearings have the advantage of a relatively long service life and do not require lubrication.

The two vertical plates 67a and 67b are preferably curved in opposite directions so that they diverge substantially from the region in which the bolts 68 are located, i.e. the region of the end portion 23a of the link 23, toward the opposite end portion 23b of the link 23, i.e. toward the rigid connection 41. In this way, the divergent portions of the plates 67a and 67b serve as reinforcement and progressive bearing mechanism for the link 23 when the latter is subjected to bending moments during operation of the harvesting device.

Figure 8:
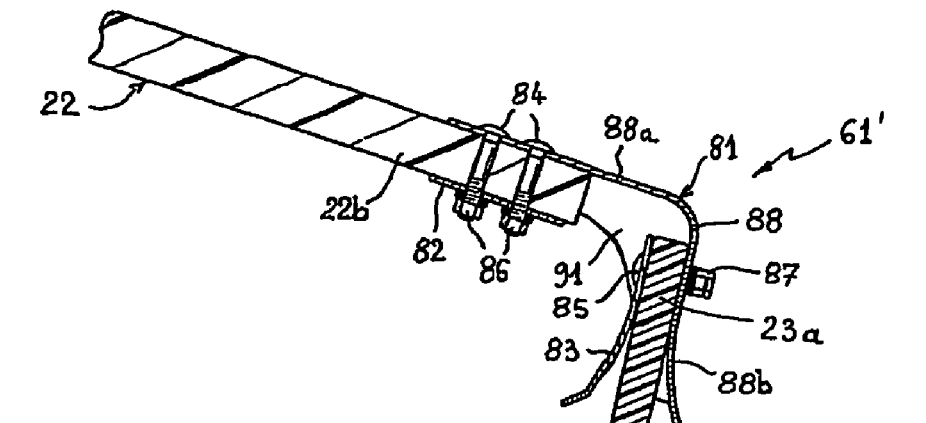
FIG. 8 is a horizontal section similar to FIG. 3 and showing another embodiment of the present invention.

In the embodiment shown in FIG. 8, the rear end 22b of each rod 22 of each shaker assembly 5 is connected to the end portion 23a of the corresponding link 23 by a rigid connection 61'. As shown in FIG. 8, the rigid connection 61' essentially comprises a connecting part 81 that is generally L-shaped and two clamping plates 82 and 83, each of which is associated with at least one, and preferably two, sets of clamping bolts 84 or 85 and clamping nuts 86 or 87.

Figure 9:
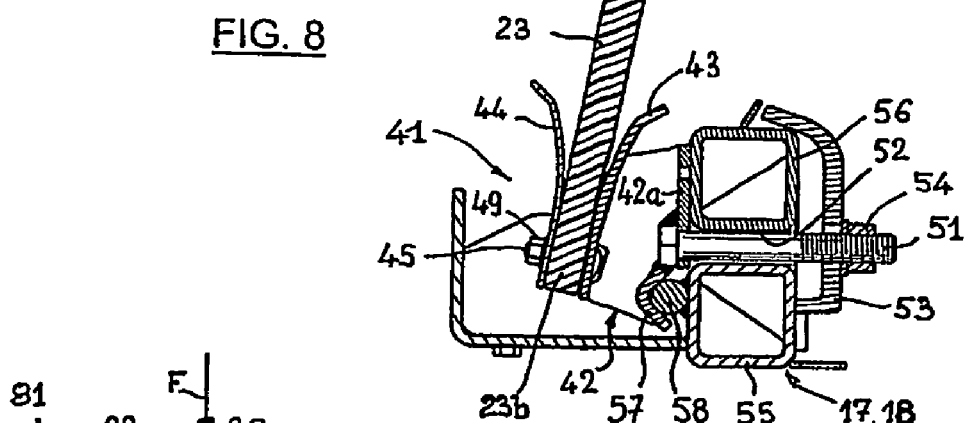
FIG. 9 is a plan view showing a rigid connecting component used in the FIG. 8 embodiment.
Figure 9:
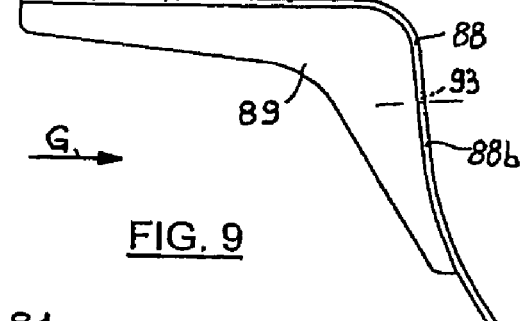
Figure 11:
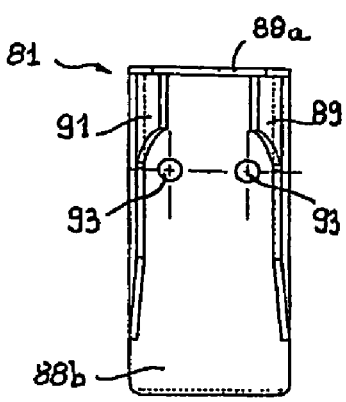
FIG. 11 is an end view of the FIG. 9 connecting component, as seen in the direction of the arrow G.
Figure 10:
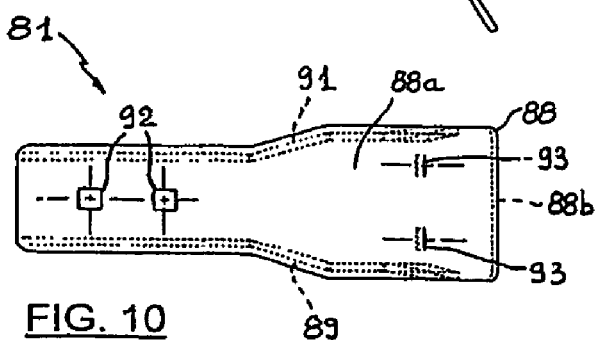
FIG. 10 is a view in lateral elevation of the FIG. 9 connecting component, as seen in the direction of the arrow F.

To be more precise, as shown in FIGS. 9 to 11, the connecting part 81 has an L-shaped vertical wall 88 and two horizontal reinforcing flanges 89 and 91 opposing deformation of the vertical wall 88. The vertical wall 88 comprises a first branch 88a having two square holes 92 for the bolts 84 and a second branch 88b having two round holes 93 for the bolts 85.

Referring again to FIG. 8, it may be seen that the clamping plate 82, the two clamping bolts 84 and the two clamping nuts 86 firmly clamp the rear end 22b of the rod 22 against the branch 88a of the connecting part 81. Similarly, the clamping plate 83, the two clamping bolts 85 and the two clamping nuts 87 firmly clamp the end portion 23a of the link 23 against the branch 88b of the connecting part 81.

The clamping plate 83 and the second branch 88b of the vertical wall 88 of the connecting part 81 are preferably curved in opposite directions so that they diverge substantially from the area in which the clamping bolts 85 are located toward the free end of the branch 88*b*. In this way, the diverging portions of the clamping plate 83 and the branch 88*b* serve as reinforcement and progressive bearing mechanism for the link 23 when the latter is bent alternately toward the front and toward the rear of the harvesting machine when the harvesting device is operating.

Moreover, by comparing FIGS. 3 and 8, it may be seen that the rigid connection 41 between the end portion 23*b* of the link 23 and the rear leg 17 or 18 of the frame is the same in both figures, and for this reason is not described again in detail.

It goes without saying that the embodiments of the invention described above are provided by way of illustrative and non-limiting example only, and that many modifications may be made thereto by the person skilled in the art that will not depart from the scope of the invention as defined by the claims. Thus in particular, although the invention has been described in relation to a self-propelled harvesting machine, it naturally applies also to a harvesting machine of the type towed by a tractor.

The invention claimed is:

1. A harvesting device for a machine for harvesting fruits or berries borne by fruit-bearing trees and shrubs planted in rows, of the type comprising:
   a) a straddle carrier frame having a vertical median plane of symmetry;
   b) two shaker assemblies which are mounted face-to-face on the frame on respective opposite sites of the vertical median plane of symmetry for shaking the fruit-bearing trees or shrubs passing between the two shaker assemblies to detach the fruits or berries therefrom, each shaker assembly comprising:
   i) drive mechanism;
   ii) a plurality of vertically spaced shaker members, each shaker member comprising a flexible material rod that extends substantially horizontally and has a curved shape, each rod having a first end that is connected to the drive mechanism, a median portion that is adapted engage the fruit-bearing trees or shrubs to shake them, and a second end that is connected to the frame by a connecting link that extends substantially horizontally and perpendicularly to said vertical median plane of symmetry so that, in operation, said second end of the rod is maintained at a substantially constant distance from said vertical median plane of symmetry;
   wherein in that said connecting link is fixed to the frame by a rigid connection and is flexible in a substantially horizontal plane, at least in an intermediate region between its two ends, so that, in operation, the end of the connecting link adjoining the rod moves to-and-fro substantially horizontally in a direction substantially parallel to said vertical median plane of symmetry, wherein in that the connecting link has an oblong cross-section with a larger dimension oriented vertically and a smaller dimension oriented horizontally, wherein in that the larger dimension and the smaller dimension of the cross-section of the connecting link are in a ratio of approximately 4:1 at least in the end portion of the connecting link adjoining the frame, wherein in that the larger dimension of the cross-section of the connecting link has a value that decreases from the end portion of the connecting link adjoining the frame toward the end portion adjoining the rod, wherein in that the ratio of the larger dimension to the smaller dimension in said end portion adjoining the rod is approximately 2.5:1, wherein in that the smaller dimension of the cross-section of the connecting link is substantially constant throughout the length of the connecting link, wherein in that said cross-section has a substantially rectangular shape, wherein in that said rigid connection comprises a mounting part that is fixed to a leg of the frame in a detachable but rigid manner such that its height is adjustable and comprises a bearing plate situated in a vertical transverse plane substantially perpendicular to said vertical median plane of symmetry, a clamping plate, and at least one clamping bolt passing through aligned holes in the clamping plate, the end portion of the connecting link adjoining the frame, and the bearing plate, to clamp said end portion adjoining the frame firmly between the bearing plate and the clamping plate, wherein in that the bearing plate and the clamping plate are curved in opposite directions so that they diverge substantially from the area in which the clamping bolt is located toward said vertical median plane of symmetry, wherein in that the end portion of the connecting link adjoining the rod is connected to the corresponding rod by an articulated connection having a vertical axis, wherein in that said vertical-axis articulated connection comprises a yoke that is fixed rigidly to the second end of the corresponding rod by nuts and bolts and has a C-shaped vertical cross-section open laterally toward the outside of the harvesting device, two flanges in the yoke, a vertical-axis socket whose axial length is less than the distance between the flanges of the yoke, two parallel vertical plates that are welded by one edge to the socket and which clamp between them the end portion of the connecting link adjoining the rod, said vertical plates are connected to said connecting link by nuts and bolts, a bolt that passes through the socket and through aligned holes in the flanges of the yoke and serves as a vertical pivot, and anti-friction members disposed radially between the socket and the bolt and axially between the socket and each of the flanges of the yoke.

2. A harvesting device of claim 1, wherein in that the end portion of the connecting link adjoining the rod is connected to the corresponding rod by a rigid connection.

3. A harvesting device of claim 2, wherein in that said rigid connection at the end of said connecting link adjoining the rod comprises a connecting part that is generally L-shaped with an L-shaped vertical wall and two horizontal reinforcing flanges opposing deformation of said vertical wall, a first clamping plate, and at least one first combination of a clamping bolt and clamping nut for firmly clamping the second end of the corresponding rod between the first clamping plate and a first branch of the L-shape formed by said vertical wall, a second clamping plate and at least one second combination of a clamping bolt and a clamping nut for firmly clamping the end portion of the connecting link adjoining the rod between the second clamping plate and a second branch of the L-shape formed by said vertical wall.

4. A harvesting device of claim 3, wherein in that said second clamping plate and said second branch of the L-shape formed by said vertical wall are curved in opposite directions so that they diverge substantially from the region in which the second bolt is located toward the free end of said second branch of the L-shape formed by said vertical wall.

5. A harvesting device of claim 4, wherein in that the connecting link is made from a plastic material.

* * * * *